United States Patent
Wang et al.

(10) Patent No.: US 10,863,217 B2
(45) Date of Patent: Dec. 8, 2020

(54) METHOD AND SYSTEM FOR SMART ADAPTIVE VIDEO STREAMING DRIVEN BY PERCEPTUAL QUALITY-OF-EXPERIENCE ESTIMATIONS

(71) Applicant: Zhou Wang, Waterloo (CA)

(72) Inventors: Zhou Wang, Waterloo (CA); Kai Zeng, Kitchener (CA); Abdul Rehman, Kitchener (CA)

(73) Assignee: SSIMWAVE Inc., Waterloo (CA)

( * ) Notice: Subject to any disclaimer, the term of this patent is extended or adjusted under 35 U.S.C. 154(b) by 262 days.

(21) Appl. No.: 15/549,337

(22) PCT Filed: Feb. 8, 2016

(86) PCT No.: PCT/CA2016/050111
§ 371 (c)(1),
(2) Date: Aug. 7, 2017

(87) PCT Pub. No.: WO2016/123721
PCT Pub. Date: Aug. 11, 2016

(65) Prior Publication Data
US 2018/0041788 A1    Feb. 8, 2018

Related U.S. Application Data

(60) Provisional application No. 62/113,401, filed on Feb. 7, 2015.

(51) Int. Cl.
*H04N 21/24*    (2011.01)
*H04N 19/102*   (2014.01)
(Continued)

(52) U.S. Cl.
CPC ......... *H04N 21/2402* (2013.01); *H04L 65/80* (2013.01); *H04N 19/102* (2014.11);
(Continued)

(58) Field of Classification Search
CPC ............ H04N 21/2402; H04N 19/102; H04N 19/154; H04N 19/164; H04N 21/2343;
(Continued)

(56) References Cited

U.S. PATENT DOCUMENTS

| 2011/0093605 A1* | 4/2011 | Choudhury ......... H04L 65/4084 709/231 |
| 2012/0117225 A1 | 5/2012 | Kordasiewicz et al. |

(Continued)

OTHER PUBLICATIONS

Wang Zhou et al: "Objective video presentation QoE predictor for smart adaptive video streaming", Visual Communications and Image Processing; Jan. 20, 2004-Jan. 20, 2004; San Jose,, vol. 9599, Sep. 22, 2015 (Sep. 22, 2015), pp. 95990Y-1 to 95990Y-13.

(Continued)

*Primary Examiner* — Abdulkader M Alriyashi

(57) ABSTRACT

The present invention is a system or method that facilitates smart decision makings at the client side for adaptive video streaming over a video delivery network by making use of perceptual video quality-of-experience predictions performed during the video preparation stage, at the video hosting or cache server side, or inside the video delivery network, and then transmitted to the client. Compared with prior art approaches of adaptive bitrate video streaming, the present invention can result in one or more of the following benefits: 1) save the overall bandwidth for the delivery of the video content without scarifying the client users' quality-of-experience; 2) create better overall visual quality-of-experience of the client users; 3) create smoother visual quality-of-experience of the client users; and 4) reduce the probability of rebuffering or stalling events at the client user side.

16 Claims, 19 Drawing Sheets

(51) Int. Cl.
*H04N 21/845* (2011.01)
*H04N 19/164* (2014.01)
*H04N 21/2343* (2011.01)
*H04N 21/238* (2011.01)
*H04L 29/06* (2006.01)
*H04N 19/154* (2014.01)

(52) U.S. Cl.
CPC .......... *H04N 19/154* (2014.11); *H04N 19/164* (2014.11); *H04N 21/2343* (2013.01); *H04N 21/23805* (2013.01); *H04N 21/8456* (2013.01)

(58) Field of Classification Search
CPC .......... H04N 21/23805; H04N 21/8456; H04L 65/80; H04L 65/601
See application file for complete search history.

(56) References Cited

U.S. PATENT DOCUMENTS

| | | |
|---|---|---|
| 2012/0278441 A1 | 11/2012 | Li et al. |
| 2013/0263167 A1 | 10/2013 | Parthasarathy et al. |
| 2013/0290492 A1 | 10/2013 | ElArabawy et al. |
| 2014/0019593 A1 | 1/2014 | Reznik et al. |
| 2014/0201324 A1* | 7/2014 | Zhang ................. H04L 65/4084 709/217 |
| 2014/0219088 A1 | 8/2014 | Oyman |
| 2014/0226765 A1* | 8/2014 | Das .......................... H04L 1/203 375/341 |
| 2014/0280679 A1 | 9/2014 | Dey et al. |
| 2015/0067184 A1 | 3/2015 | Parthasarathy |
| 2016/0050241 A1* | 2/2016 | Lotfallah ............. H04L 67/2804 709/219 |
| 2016/0050246 A1* | 2/2016 | Liao ...................... H04L 5/0085 709/219 |
| 2016/0105728 A1* | 4/2016 | Schmidmer ........ H04N 21/6125 725/110 |

OTHER PUBLICATIONS

Z. Wang and A. Bovik, "Mean squared error: love it or leave it?—a new look at signal fidelity measures," IEEE Signal Processing Magazine, vol. 26, pp. 98-117, Jan. 2009.

Z. Wang, A. C. Bovik, H. R. Sheikh, and E. P. Simoncelli, "Image quality assessment: From error visibility to structural similarity," IEEE Transactions on Image Processing, vol. 13, No. 4, pp. 600-612, Apr. 2004.

Z. Wang, L. Lu, and A. C. Bovik, "Video quality assessment based on structural distortion measurement," Signal Processing: Image Communication, vol. 19, pp. 121-132, Feb. 2004.

Z. Wang, E. P. Simoncelli, and A. C. Bovik, "Multi-scale structural similarity for image quality assessment", IEEE Asilomar Conference on Signals, Systems and Computers, Nov. 2003.

M. H. Pinson, "A new standardized method for objectively measuring video quality", IEEE Transactions on Broadcasting, vol. 50, No. 3, pp. 312-322, Sep. 2004.

K. Seshadrinathan and A. C. Bovik, "Motion tuned spatio-temporal quality assessment of natural videos", IEEE Transactions on Image Processing, vol. 19, No. 2, pp. 335-350, Feb. 2010.

A. Rehman, K. Zeng and Z. Wang, https://ece.uwaterloo.car/70wang/research/ssimplus/.

A. Rehman, K. Zeng and Z. Wang, "Display device-adapted video quality-of-experience assessment," IS&T—SPIE Electronic Imaging, Human Vision and Electronic Imaging XX, Feb. 2015.

* cited by examiner

METHOD AND SYSTEM FOR SMART ADAPTIVE VIDEO STREAMING DRIVEN BY PERCEPTUAL QUALITY-OF-EXPERIENCE ESTIMATIONS

FIELD OF THE INVENTION

This invention relates in general to streaming videos from a video hosting server to clients through a video delivery network so as to optimize the quality-of-experience of the client users. More particular, the video streams at the server side are divided into segments, each with multiple streams of different bitrate and resolutions. The present invention is related a method or system that makes the optimal decisions at the client side on picking the next segments from the streams at the server side, so as to achieve one or more of the following benefits: 1) save the overall bandwidth for the delivery of the video content without scarifying the client users' quality-of-experience; 2) create better overall visual quality-of-experience of the client users; 3) create smoother visual quality-of-experience of the client users; and 4) reduce the probability of rebuffering or stalling events at the client user side. The present invention may be used in many applications that employ the general adaptive streaming approach.

BACKGROUND OF THE INVENTION

In the past few years, we have witnessed an exponential increase in the volume of video data being delivered over the networks. An increasingly popular approach for video-on-demand (VoD) applications is to the adoption of adaptive video streaming techniques. In adaptive video streaming, each source video content is encoded/transcoded into multiple variants (or streams) of different bitrates and resolutions in the video stream preparation stage. The video streams are divided into time segments and all streams are stored in the video hosting server. When a client watches the video content, it can adaptively pick one of the many streams for each time segment based on network bandwidth, buffer size, playback speed, etc. The adaptive video streaming framework puts the burden at the server side due to increased CPU power for repeated encoding/transcoding demand and increased storage space to store many streams of the same content. However, it allows to serve users of large variations in terms of their connections to the network without changing the infrastructure, with the potential to provide the best possible service to each individual user on a moment-by-moment basis.

Nevertheless, a major problem with the current implementation and deployment of adaptive streaming techniques is not properly taking the viewer's quality-of-experience (QoE) into account. Video quality assessment has been an active research topic in recent years. Here when we use the term of video quality, we mean the perceptual quality of the video stream, without considering the perceptual quality variations when the video is undergoing network transmission and displayed on different device, with different resolutions, and at different viewing conditions, etc. By contrast, by QoE, we mean to take into account as much as such variations as possible. For example, at the server side of a video delivery service, only video quality can be assessed, and video QoE cannot be directly measured, but certain parameters that can help predict video QoE can be estimated. At the client side, video QoE can be estimated, because all related information becomes available. Since the ultimate goal of video delivery service is to provide the clients with the best possible video in terms of their visual QoE, properly assessing visual QoE and using such assessment as the key factor in the design and optimization of the video delivery system is highly desirable. Unfortunately, this is exactly what is missing in the current adaptive video streaming implementations. Real-world systems typically use bit rate as the key factor, equating it to a visual quality indicator, but using the same bit rate to encode different video content could result in dramatically different visual quality, possibly ranging between the two extremes on a standard five-category (Excellent, Good, Fair, Poor, Bad) human subjective rating. Even worse, the actual user QoE varies depending on the device being used to display the video, another factor that cannot be taken into account by bit rate-driven streaming strategies.

The present invention relates to how to make video QoE estimation available to the client and how to use the QoE estimates in the decision making steps in adaptive video streaming at the client site. back to the driver's seat and redesign video delivery systems.

SUMMARY OF THE INVENTION

A method or system that uses visual QoE as a critical factor to provide smart adaptive video streaming, or smart streaming, over a video delivery network.

One embodiment relates to adaptive video streaming over video delivery networks that creates multiple video streams of different bitrates and resolutions from the same video source content, and divide them into time segments. QoE prediction parameters are generated and transmitted prior to or together with the video streams to the receiver client site. At the client site, visual QoE is estimated and used as a critical decision making factor in requesting the next video segments of the video streams.

Another embodiment relates to providing a QoE estimation at the client site by combining QoE prediction parameters with instant network and receiver conditions, including erroneous transmission and/or decoding, initial buffering and rebuferring, pixel resolution of viewing device, physical size of viewing device, video frame pixel resolution on device, video temporal resolution, video playback speed on device, viewing environment condition, user preference, user vision condition, or user expectation.

Another embodiment relates to producing QoE prediction parameters using models of full-reference, reduced-reference and/or no-reference objective video quality assessment, models that can compare video quality across different spatial and/or temporal resolutions, and models that predict perceptual QoE dependent on the type and settings of the viewing device, the resolution of the playback window on the viewing device, and/or the viewing conditions.

Another embodiment relates to transmitting QoE estimation parameters through the video delivery network as metadata prior to the transmission of the video streams or together with the transmission of video streams, or by embedding the parameters as watermarks or hidden messages into the video streams.

Another embodiment relates to creating a matrix of viewer QoE for each segment of each video stream at the client site, and making decisions on the selection of the next segment of the video by combining QoE estimation with other available information, including one or more of the bitrates of video streams, the resolutions of the video streams, the available bandwidth of the network, the decoding speed, display speed, buffer size and power of the receiver device.

Another embodiment relates to making smart adaptive streaming decisions on the selection of the next segment of the video at the client site to save bandwidth, to reduce the probability of rebuffering, to improve the overall quality-of-experience, and/or to maintain smoothness of quality-of-experience, by using QoE as the critical factor to decide between no switching, switching to lower bitrate, and switching to higher bitrate.

Another embodiment relates to making smart adaptive streaming decisions on the selection of the next multiple segments of the video at the client site to save bandwidth, to reduce the probability of rebuffering, to improve the overall quality-of-experience, and/or to maintain smoothness of quality-of-experience, by using a dynamical programming approach to find the best path that maximizes the average quality and/or smoothness of visual QoE.

It is to be understood that the invention is not limited in its application to the details of construction and to the arrangements of the components set forth in the description or the examples provided therein, or illustrated in the drawing. The invention is capable of other embodiments and of being practiced and carried out in various ways. It is to be understood that the phraseology and terminology employed herein are for the purpose of description and should not be regarded as limiting. The features and advantages described in this application are not all inclusive. To one of ordinary skills in the art, additional features and advantages will be apparent in view of the drawings, claims, and descriptions. The language used in this application is chosen for better readability and for instructional purpose, and may not be chosen to delineate or circumscribe the disclosed subject matter.

Figure 1:
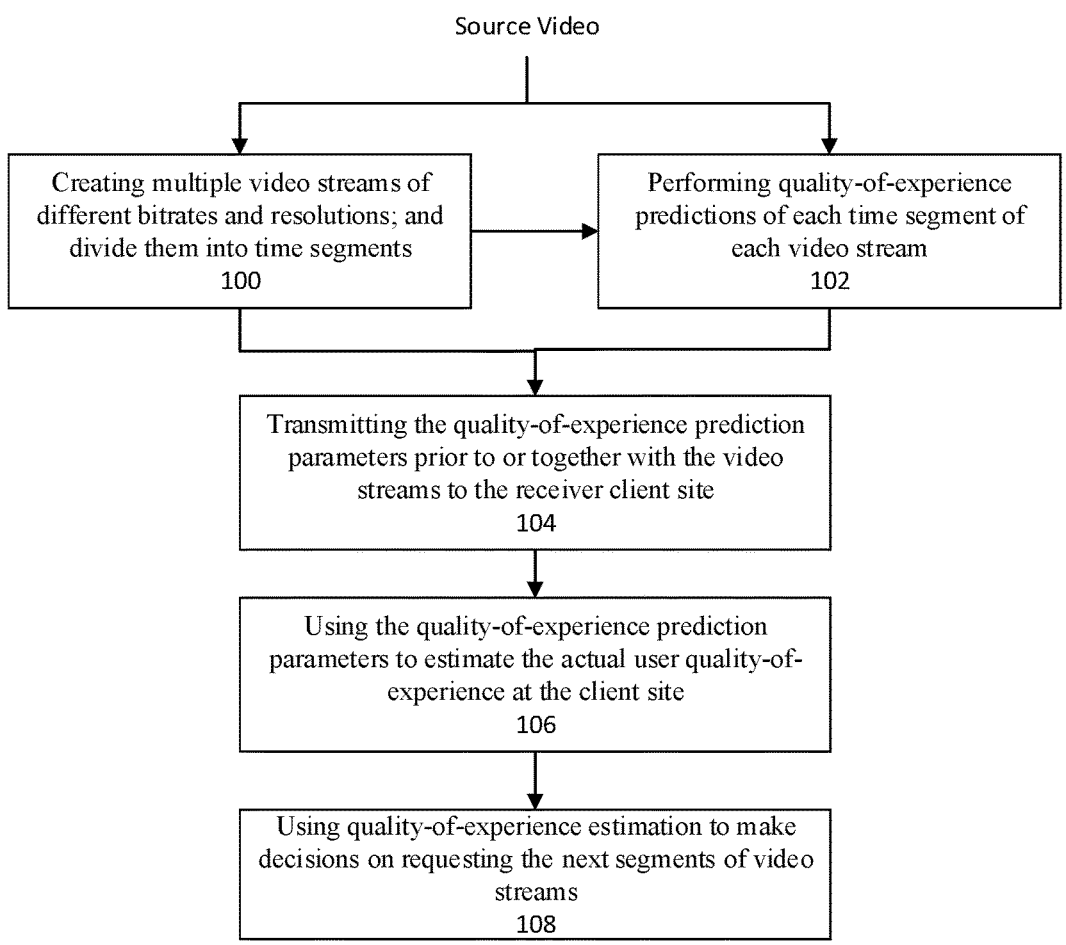
FIG. 1 shows the system diagram of process of adaptive video streaming based on perceptual QoE estimations.

In the drawings, embodiments of the present invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The present disclosure relates to a method, system, or computer program for intelligent adaptive video streaming over video delivery networks. The technique, which we call smart adaptive video streaming or smart streaming has one or more of the following advantages: 1) save the overall bandwidth for the delivery of the video content without scarifying the client users' quality-of-experience; 2) create better overall visual quality-of-experience of the client users; 3) create smoother visual quality-of-experience of the client users; and 4) reduce the probability of rebuffering or stalling events at the client user side.

Figure 2:
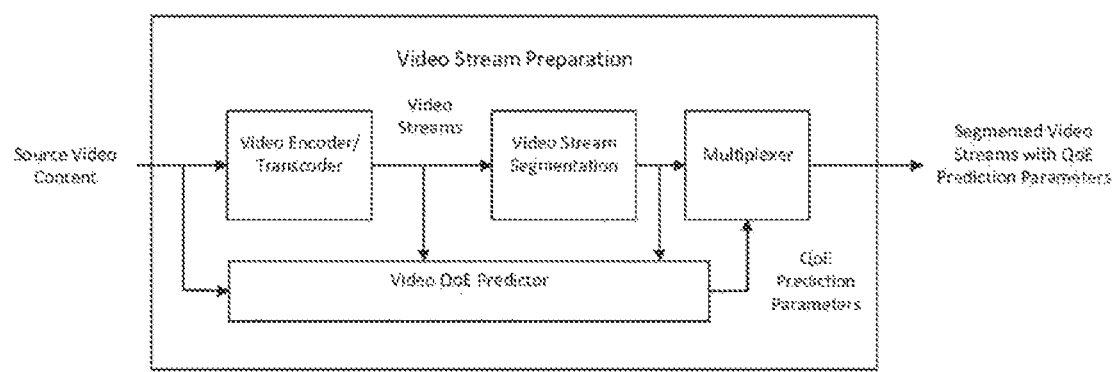
FIG. 2 shows the flow diagram in the video stream preparation stage that involves video QoE prediction.
Figure 3:
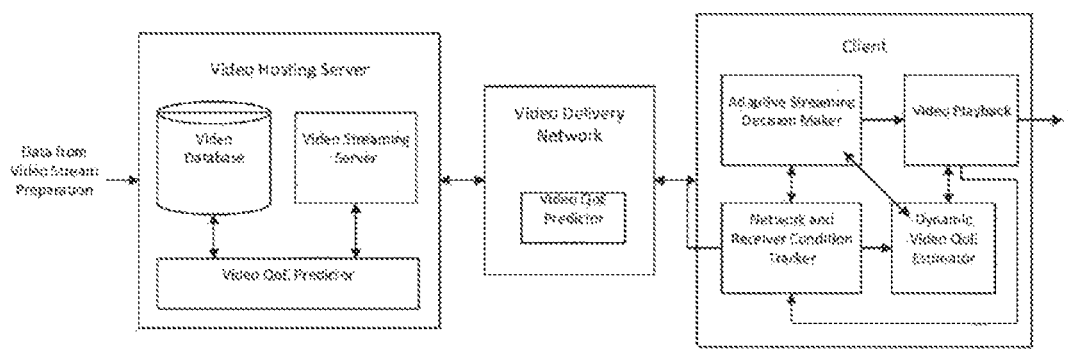
FIG. 3 shows the flow diagram between video hosting server, video delivery network, and client in an embodiment of the present invention.

One embodiment of the present invention is a method, system or computer program that comprise the following steps: 1) creating multiple video streams of different bitrates and resolutions from the same video source content, and divide them into time segments 100; 2) performing QoE predictions of the video streams during the video preparation stage, at the video hosting site, and/or inside the video delivery network, resulting a multi-dimensional array of QoE prediction parameters for the video streams 102; 3) transmitting the QoE prediction parameters prior to or together with the video streams to the receiver client site 104; and 4) at the client site, using the received quality-of-experience prediction parameters and client side network, device and viewing environment information to estimate the actual user QoE 106 and to request for the next segments of video streams 108. An overall system flow chart is given in FIG. 1. A flow diagram that involves QoE predictions of the video streams at the video stream preparation stage is given in FIG. 2. A flow diagram that involves QoE predictions of the video streams at the video hosting server and/or the video delivery network is given in FIG. 3, which also gives the flow diagram at the client site on creating instant QoE estimation and on making streaming decisions in one embodiment of the present invention.

Figure 4:
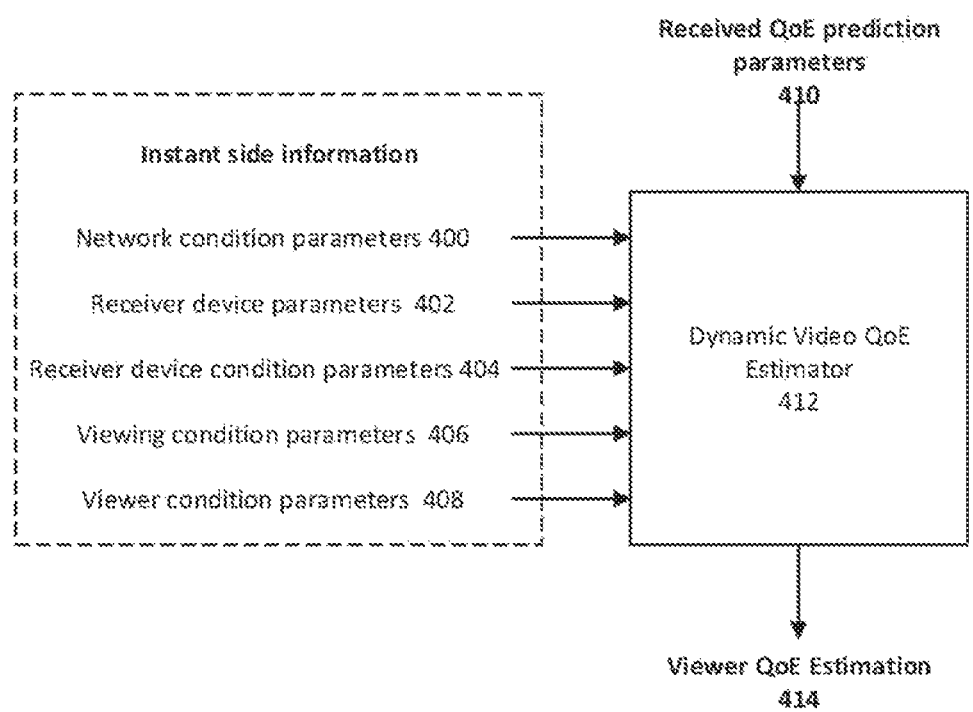
FIG. 4 shows the flow diagram of dynamic viewer QoE estimation by using received QoE prediction parameters as the key factor, which is combined with other instant side information.

Another embodiment of the present invention makes a QoE estimation at the client site statically by directly using the QoE prediction parameters received from the network 410. Yet in another embodiment of the present invention, the QoE estimation 414 at the client site is performed dynamically 412 by combining QoE prediction parameters 410 received from the network with one or multiple instant network 400 and receiver conditions 402 404 406 408. These conditions may include one or more of erroneous transmission and/or decoding, initial buffering and rebuffering, pixel resolution of viewing device, physical size of viewing device, video frame pixel resolution on device, video temporal resolution, video playback speed on device, viewing environment condition, user preference, user vision condition, and user expectation. A diagram that shows the dynamic QoE estimation process, where the QoE prediction parameters play a key role, is given in FIG. 4.

In another embodiment of the present invention, human subjective QoE measurement is conducted on the video streams during the video preparation stage, at the video hosting site, or inside the video delivery network. Statistical features, such as the mean opinion scores and the standard deviation/variance of the subjective opinion scores, computed from the subjective measurement results are used as the QoE prediction parameters.

In another embodiment of the present invention, computational full-reference, reduced-reference, and/or no-reference objective video quality assessment models such as PSNR [1], SSIM [2, 3], MS-SSIM [4], VQM [5], MOVIE [6] and SSIMplus, [7,8,9] may be used as perceptual QoE predictors.

Another embodiment of the present invention uses full-reference and/or reduced-reference objective perceptual models that produce parameters that are able to compare video quality across different spatial and/or temporal resolutions as the perceptual QoE predictors. Most existing objective perceptual models do not have this capability. An ideal candidate that serves this purpose is the SSIMplus measure.

Another embodiment of the present invention uses objective perceptual video quality models that produce parameters that predict perceptual QoE dependent on the type and settings of the viewing device, the spatial and temporal resolutions of the playback window on the viewing device, and/or the viewing conditions of the video at the client site. Most existing objective perceptual models do not have this capability. An ideal candidate that serves this purpose is the SSIMplus measure.

Another embodiment of the present invention transmits the QoE prediction parameters as metadata prior to the transmission of the video streams or together with the transmission of video streams. For example, the QoE parameters may be included in the headers of the video files, or be included as part of the metadata transmitted to the client in an XML file prior to the transmission of the video streams. In another embodiment of the present invention, the QoE prediction parameters may be embedded into the video streams themselves using watermarking or data hiding technologies, and thus are transmitted together with the video streams to the client sites.

Figure 5:
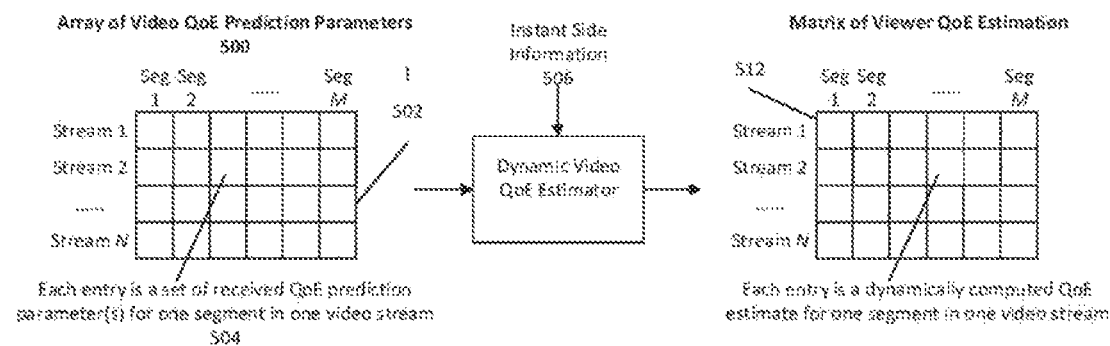
FIG. 5 plots the flow diagram of converting a received array of video QoE prediction parameters for each video segment in each video stream to a matrix of viewer QoE estimation for each video segment in each video stream.

Another embodiment of the present invention creates a matrix of viewer QoE estimation 502 for each segment of each video stream at the client site 504, and then use the matrix in the streaming decision making step on the selection of the next segments of video. The process of the generation of the QoE estimation matrix 512 is illustrated in FIG. 5, where the QoE prediction parameters 500 are the most key factors that are further combined with the instant network and receiver conditions 506 (as exemplified in FIG. 4) for all segments in all streams.

Figure 6:
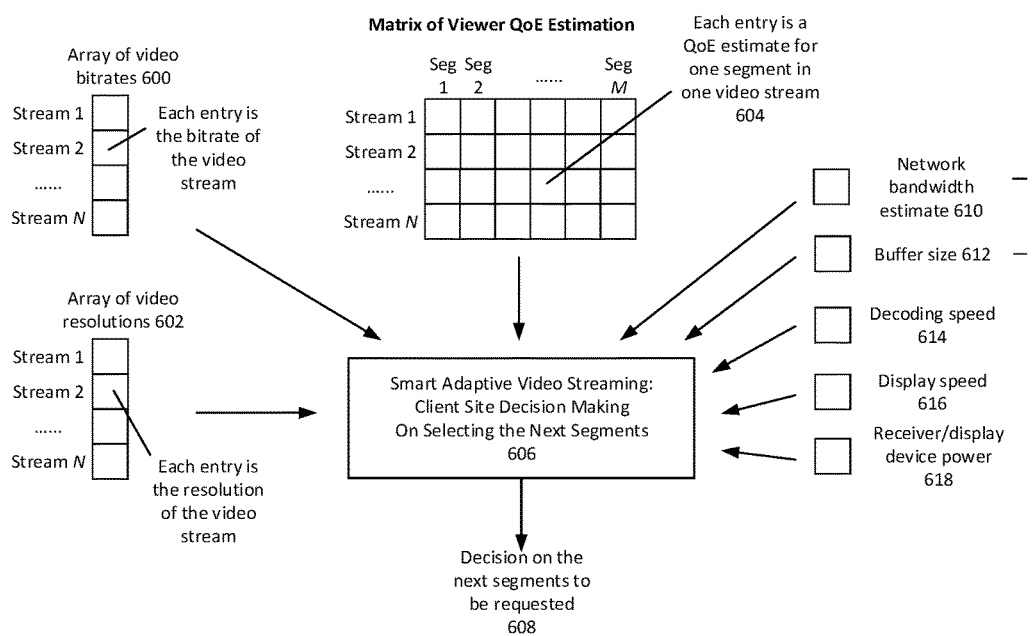
FIG. 6 plots the flow diagram of smart adaptive streaming decision making on selecting the next segments. The matrix of viewer QoE estimation plays a central role, with additional information including one or more of the bitrates of the video streams, the resolutions of the video streams, the available bandwidth of the network, and the decoding speed, display speed, buffer size and power of the receiver device.

Another embodiment of the present invention includes a streaming decision making step 606 on the selection of the next segment of the video 608 at the client site that combines QoE estimation 604 with other available information, including one or more of the bitrates of video streams 600, the resolutions of the video streams 602, the available bandwidth of the network 610, and the decoding speed 614, display speed 616, buffer size 612 and power of the receiver device 618. A flow diagram that illustrates this process is shown in FIG. 6.

Figure 7:
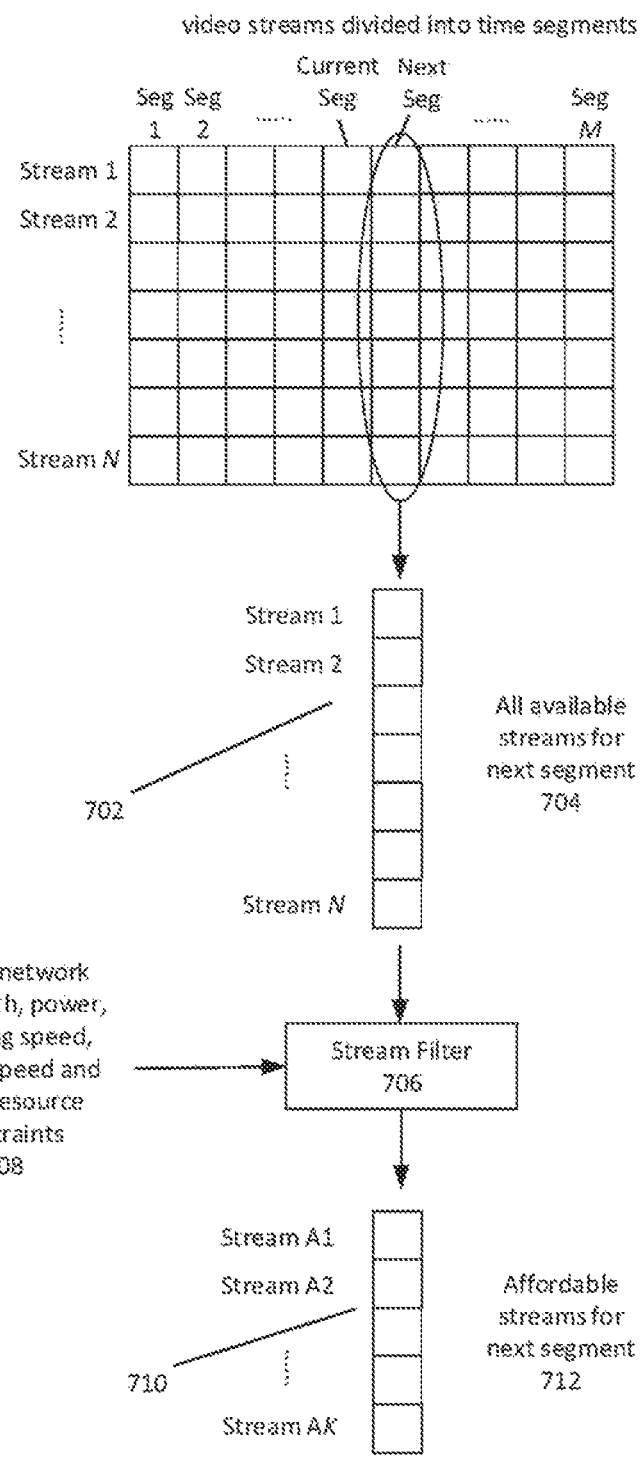
FIG. 7 plots the flow diagram of applying a "stream filter" that reduces the number of all available streams for the next segment to a subset of affordable streams. The "stream filtering" process is implemented by applying one or more of constraints on the video bitrate, network bandwidth, decoding speed, display speed, buffer size and device power.

Another embodiment of the present invention includes a streaming decision making step on the selection of the next segment of the video at the client site that picks the maximal QoE video stream, under the constraints of video bitrate, network bandwidth, decoding speed, display speed, buffer size and device power 708. After applying all such constraints on all available video streams 702 704 for the next segments, a subset of these video streams are left 710 712. This process is referred to as a "stream filter" in this application 706, and the remaining streams after applying the stream filter are referred to as the "affordable streams" 712. An example is that the buffer size should be maintained above a threshold level after adopting a video stream (to reduce the potential of rebuffering or stalling), and to meet such a condition, some of the streams that have high bitrates are not affordable and are thus filtered out. A flow diagram that illustrates the general process is given in FIG. 7.

Figure 8:
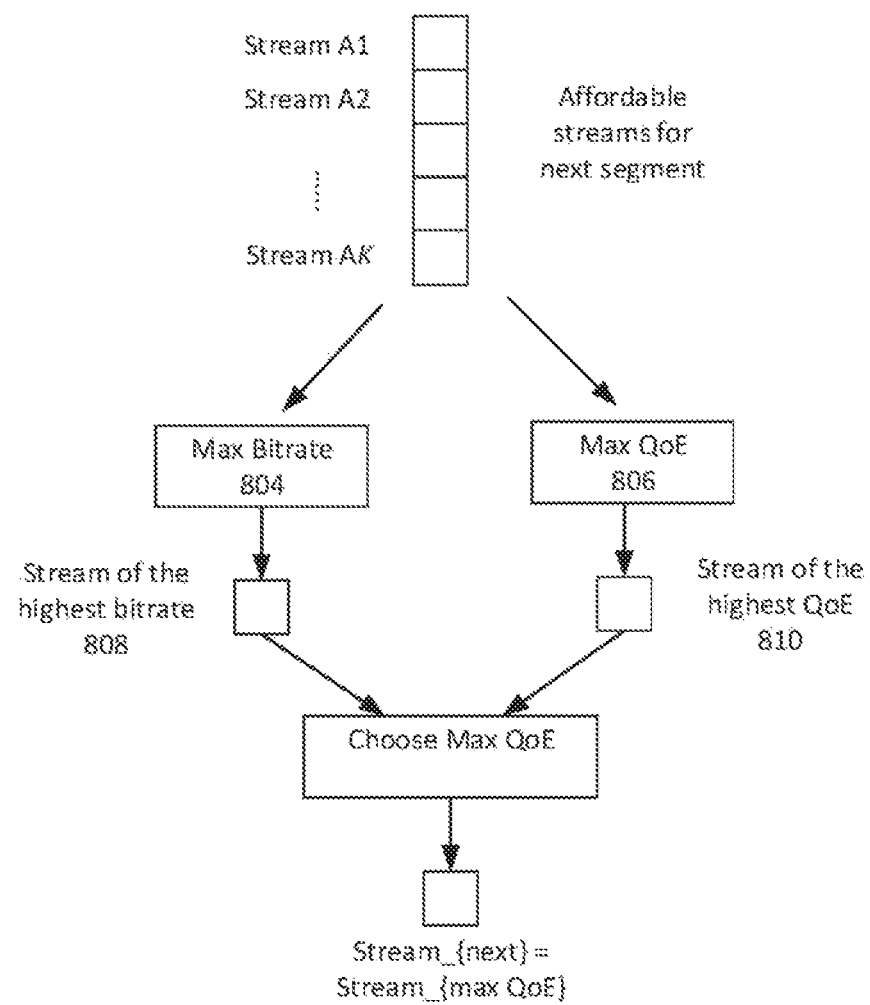
FIG. 8 plots the flow diagram of decision making on selecting the stream for the next video segment in one embodiment of the present invention. Prior art approaches do not have QoE estimate information available, but assume higher bitrate leads to higher QoE. The present invention allows for a different decision by choosing the stream with the maximal QoE.

Another embodiment of the present invention includes a streaming decision making step on the selection of the next segment of the video at the client site that picks the maximal QoE stream, under the constraints of video bitrate, network bandwidth, decoding speed, display speed, buffer size and device power. A flow diagram is given in FIG. 8. Prior art approaches do not have QoE estimate information available, but assume that higher bitrate leads to higher QoE, and thus choose the stream of the highest bitrate 804, which may not be the best choice for optimal QoE 806 810. The present invention allows for a different decision by finding the maximal QoE 806 810 of all affordable streams. This leads to one or more of three advantages: 1) Improved QoE given by the difference between QoE_{highest QoE stream 810} ad QoE_{highest bitrate stream 808}; 2) Reduced bitrate given by the difference between Bitrate_{highest bitrate stream 808}–Bitrate_{highest QoE stream 810}; 3) Lower probability of rebuffering/stalling event, because the lower rate of the video streams lead to larger buffer (given the same network bandwidth condition), which reducing the probability of running into low or empty buffer that may trigger rebuffering or stalling during video playback.

Figure 9:
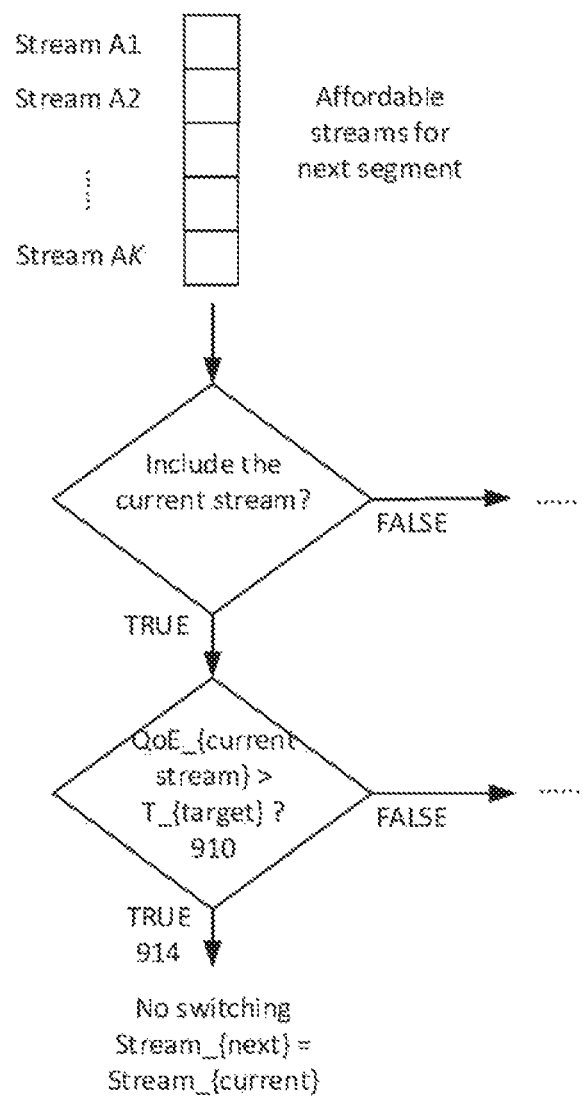
FIG. 9 plots the flow diagram of decision making on selecting the stream for the next video segment in one embodiment of the present invention. When without switching, QoE maintains at or above a pre-determined target threshold level, the present invention may reject to switch to a higher bitrate and/or higher resolution stream, even if such switching is affordable. This is different from prior art approaches which make the best effort to request the stream of the highest affordable bitrate, regardless of the actual QoE of that stream.

Another embodiment of the present invention includes a streaming decision making step on the selection of the next segment of the video at the client site to save bandwidth, to reduce the probability of rebuffering, to improve the overall QoE, and/or to maintain smoothness of QoE, by rejecting 914 to switch to an affordable higher bitrate and/or higher resolution stream, when without such switching, the QoE maintains at or above a pre-determined target threshold level 910. A flow diagram is shown in FIG. 9. This is different from prior art approaches which make the best effort at the client side to request the stream of the highest affordable bitrate, regardless of the actual QoE of that stream. Such difference allows the present invention to save bitrate by not switching to the highest affordable bitrate stream and to reduce the probability of rebuffering because more video content can be buffered for the same network bandwidth.

Figure 10:
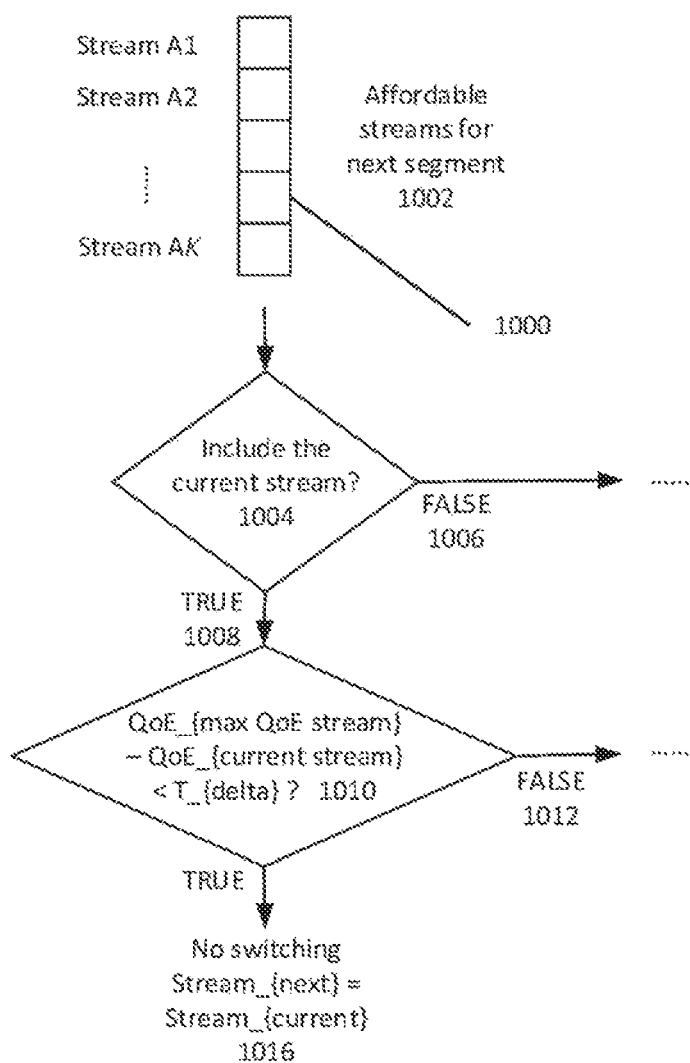
FIG. 10 plots the flow diagram of decision making on selecting the stream for the next video segment in one embodiment of the present invention. The present invention may reject to switch to an higher bitrate and/or higher resolution stream, even if such switching is affordable, when such switching results in QoE increases lower than a threshold value. This is different from prior art approaches which make the best effort to request the stream of the highest affordable bitrate, regardless of how much QoE improvement can be achieved by switching to that stream.

Another embodiment of the present invention includes a streaming decision making step on the selection of the next segment of the video at the client site to save bandwidth, to reduce the probability of rebuffering, to improve the overall QoE, and/or to maintain smoothness of QoE, by rejecting 1016 to switch to an affordable higher bitrate and/or higher resolution stream when such switching results in QoE increases lower than a threshold value 1010. A flow diagram is shown in FIG. 10. This is different from prior art approaches which make the best effort at the client side to request the stream of the highest affordable bitrate, regardless of how much QoE improvement can be achieved by switching to that stream. Such difference allows the present invention to save bitrate by not switching to the higher affordable bitrate stream and to reduce the probability of rebuffering because more video content can be buffered for the same network bandwidth.

Figure 11:
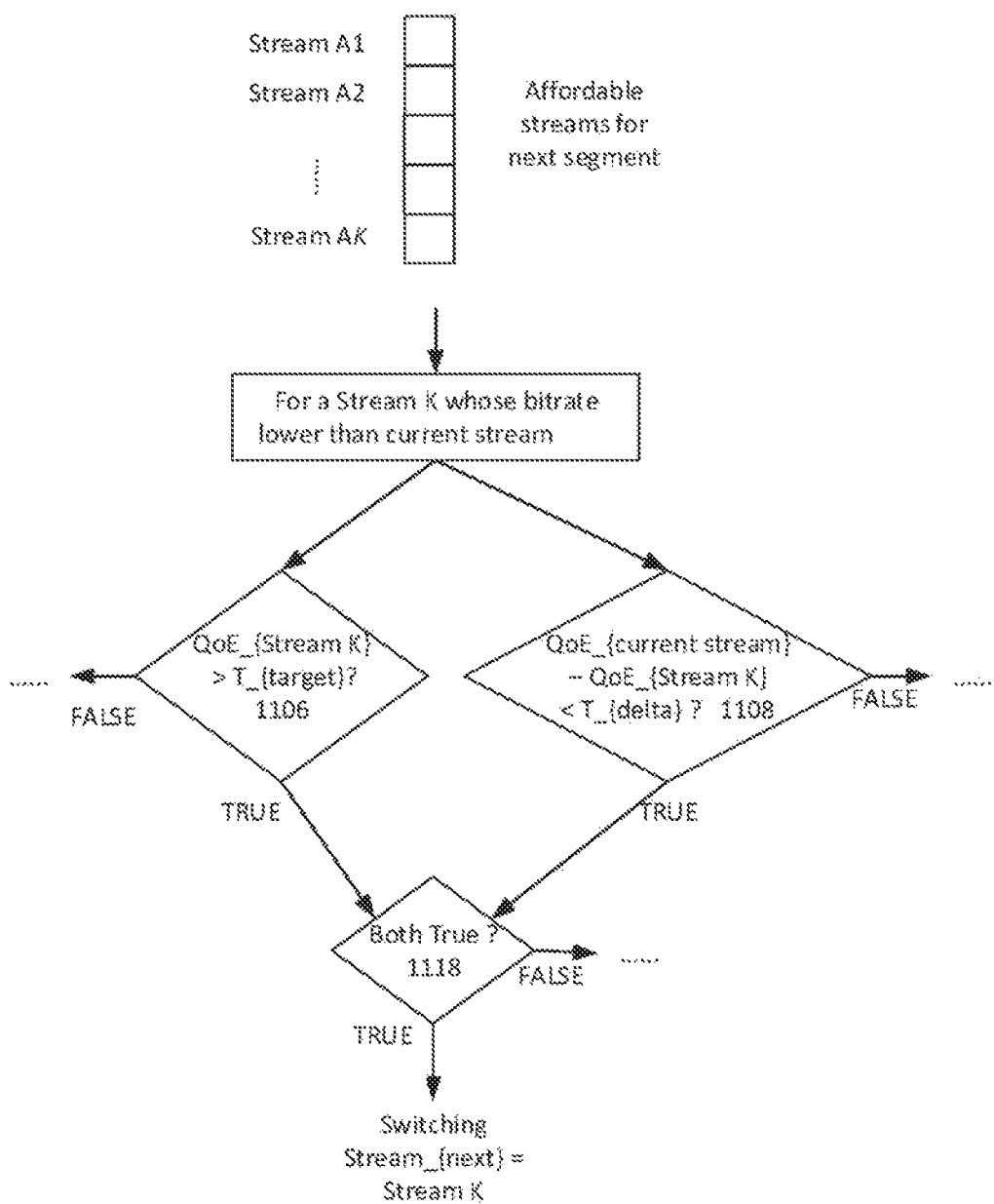
FIG. 11 plots the flow diagram of decision making on selecting the stream for the next video segment in one embodiment of the present invention. The present invention may switch to a lower bitrate and/or lower resolution stream, even without seeing a drop in network bandwidth or buffer size, when such switching results in QoE drops lower than a threshold value, and when with such switching, the QoE maintains at or above a pre-determined target threshold QoE level. This is different from prior art approaches which make the best effort to request the stream of the highest affordable bitrate. Thus when there is no drop in network bandwidth or buffer size, prior art approaches will keep requesting the streams equaling or higher than the bitrate of the current stream, but will not switch to a lower bitrate stream.
Figure 12:
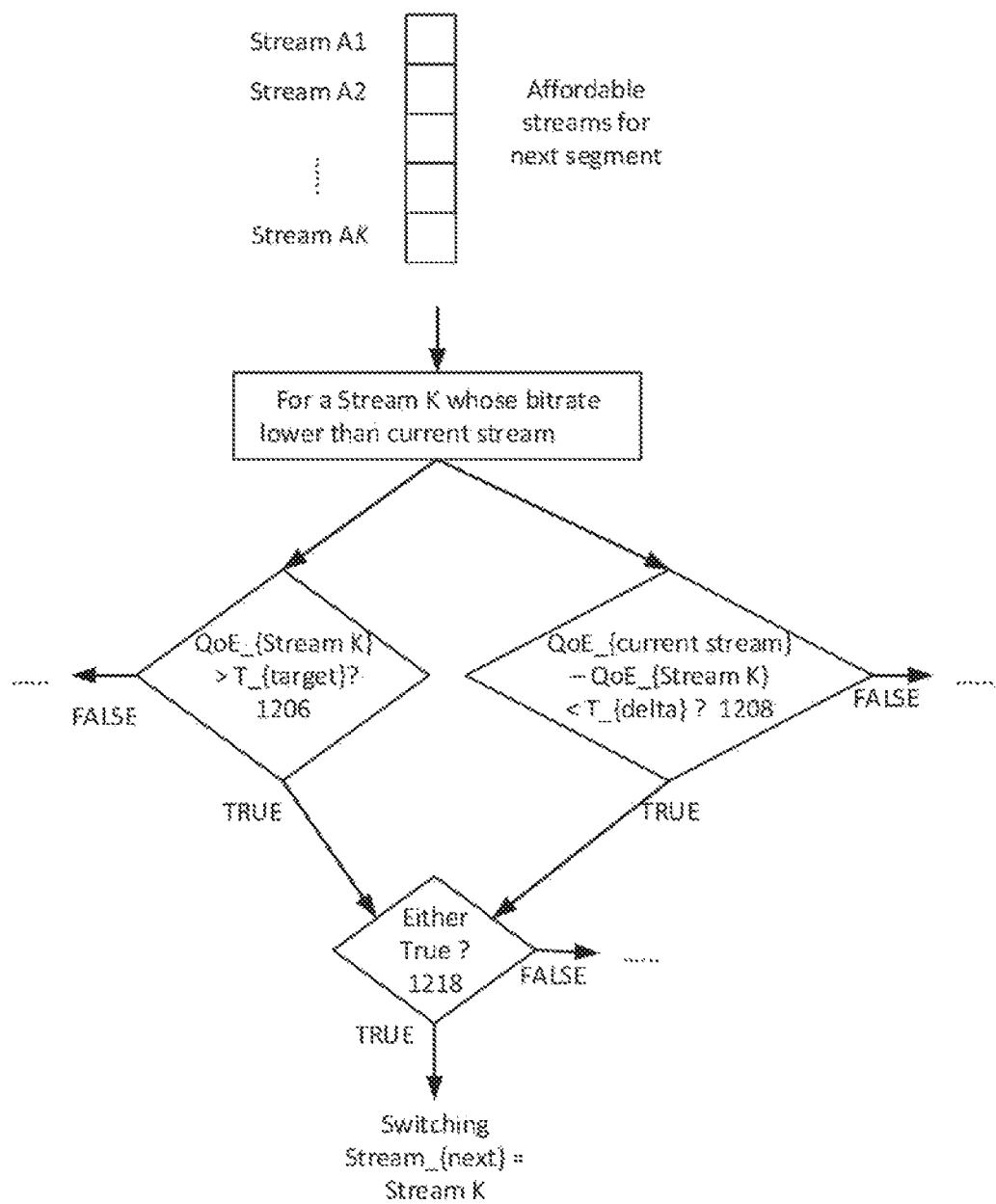
FIG. 12 plots the flow diagram of decision making on selecting the stream for the next video segment in one embodiment of the present invention. The present invention may switch to a lower bitrate and/or lower resolution stream, even without seeing a drop in network bandwidth or buffer size, when such switching results in QoE drops lower than a threshold value, or when with such switching, the QoE maintains at or above a pre-determined target threshold QoE level. This is different from prior art approaches which make the best effort to request the stream of the highest affordable bitrate. Thus when there is no drop in network bandwidth or buffer size, prior art approaches will keep requesting the streams equaling or higher than the bitrate of the current stream, but will not switch to a lower bitrate stream.

Another embodiment of the present invention includes a streaming decision making step on the selection of the next segment of the video at the client site to save bandwidth, to reduce the probability of rebuffering, to improve the overall QoE, and/or to maintain smoothness of QoE, by switching to a lower bitrate and/or lower resolution stream, with or without seeing a drop in network bandwidth or buffer size, (A) when such switching results in QoE drops lower than a threshold value 1108 1208, and/or (B) when with such switching, the QoE maintains at or above a pre-determined target threshold QoE level 1106 1206. Two flow diagrams are shown in FIG. 11 and FIG. 12, with different combinations 1118 1218 of the above conditions (A) and (B). This is different from prior art approaches which make the best effort at the client side to request the stream of the highest affordable bitrate. Thus when there is no drop in network bandwidth or buffer size, prior art approaches keep requesting the streams equaling or higher than the bitrate of the current stream, but will not switch to a lower bitrate stream. Such difference allows the present invention to save bitrate by switching to a lower bitrate stream and to reduce the probability of rebuffering because more video content can be buffered for the same network bandwidth.

Figure 13:
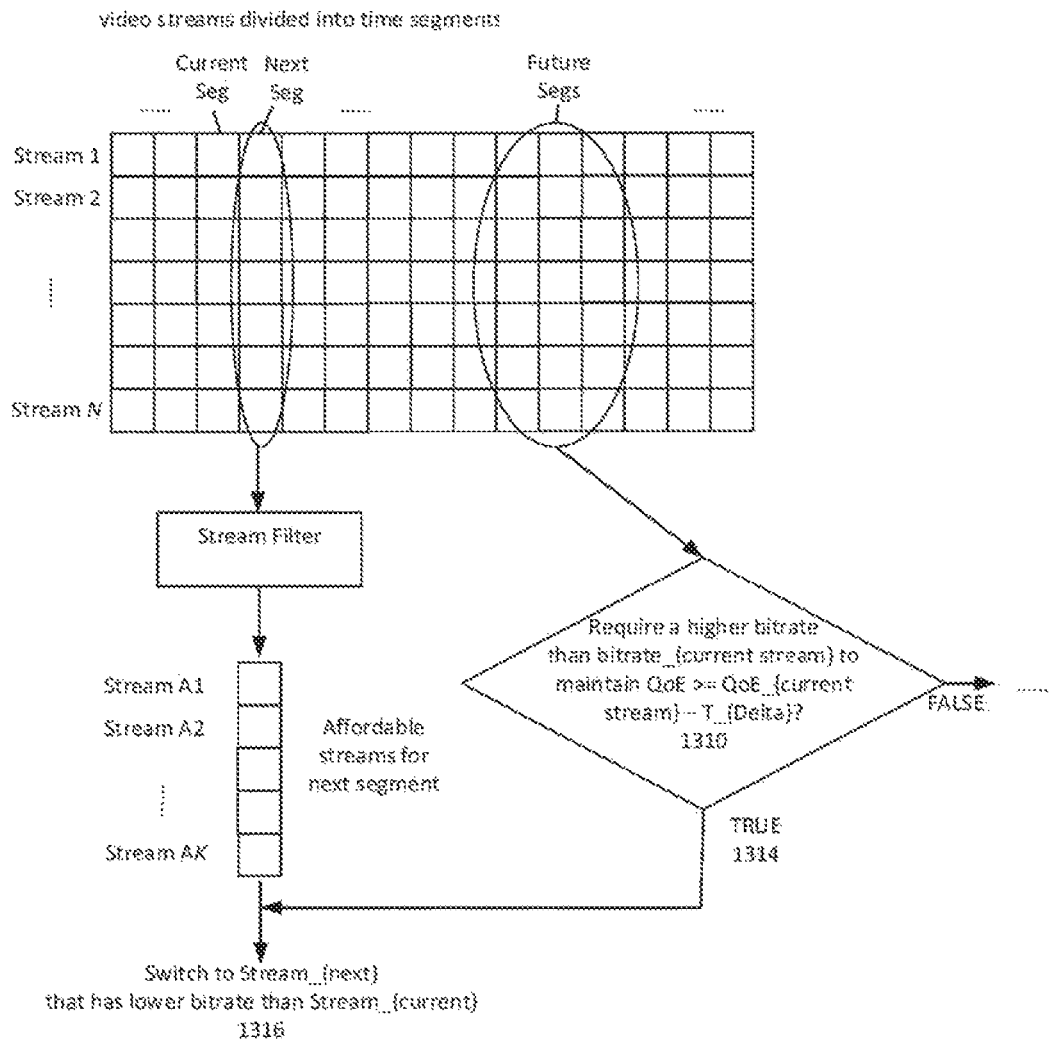
FIG. 13 plots the flow diagram of decision making on selecting the stream for the next video segment in one embodiment of the present invention. The present invention may switch to a lower bitrate and/or lower resolution stream, even without seeing a drop in network bandwidth or buffer size, when foreseeing future video segments that need higher than the current bitrate to maintain the same level of QoE. This is different from prior art approaches which make the best effort to request the stream of the highest affordable bitrate, with no knowledge about the difficulty in maintaining the same level of QoE in future portions of the video.

Another embodiment of the present invention includes a streaming decision making step on the selection of the next segment of the video at the client site to save bandwidth, to reduce the probability of rebuffering, to improve the overall QoE, and/or to maintain smoothness of QoE, by switching to a lower bitrate and/or lower resolution stream 1316, with or without seeing a drop in network bandwidth or buffer size, when foreseeing future video segments that need higher than the current bitrate to maintain the same level of QoE 1310 1314. A flow diagram is shown in FIG. 13. This is different from prior art approaches which make the best effort at the client side to request the stream of the highest affordable bitrate, with no knowledge about the difficulty in maintaining the same level of QoE in future portions of the video. As a result, when there is no drop in network bandwidth or buffer size at the current moment, prior art approaches will keep requesting the streams equaling or higher than the bitrate of the current stream, and will not switch to a lower bitrate stream. The capability of switching to lower bitrate stream of the present invention makes a difference from prior art. Such difference allows the present invention to save bitrate at the current moment of low complexity content by switching to a lower bitrate stream 1316, and reserve bandwidth capacities for future video segments that are more complex and desire more bitrates to maintain the QoE. As such, the present invention leads to improved smoothness of QoE, reduced the probability of rebuffering and stalling event at future complex segments, and increased the overall QoE.

Figure 14:
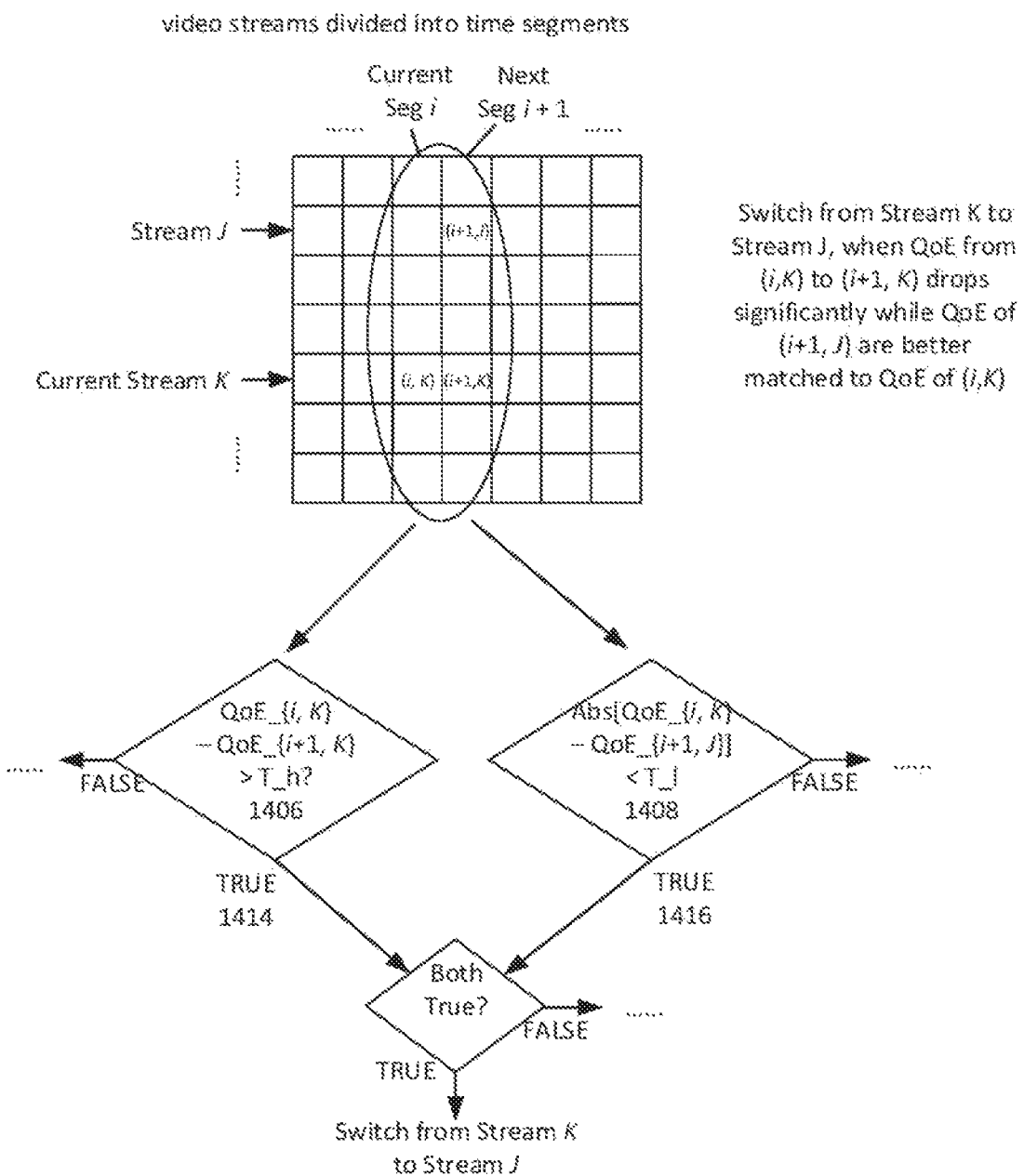
FIG. 14 plots the flow diagram of decision making on selecting the stream for the next video segment in one embodiment of the present invention. The present invention may switch to a stream of higher bitrate and/or higher resolution stream, even without seeing an increase in network bandwidth or buffer size, when without such switching, the QoE drops more than a threshold value, and when the absolute difference in QoE between the higher bitrate stream and the current stream at the next segment is lower than another threshold. This is different from prior art approaches which have no knowledge about the difficulty in maintaining the same level of QoE in the next segment and will stay at the same stream.

Another embodiment of the present invention includes a streaming decision making step on the selection of the next segment of the video at the client site to maintain the current level and smoothness of QoE by switching to a stream of higher bitrate and/or higher resolution stream, with or without seeing an increase in network bandwidth or buffer size, when without such switching, the QoE drops more than a threshold value 1406 1414, and when the absolute difference in QoE between the higher bitrate stream and the current stream at the next segment is lower than another threshold 1408 1416. A flow diagram showing an illustrative example is given in FIG. 14. In the current stream K, the complexity and QoEs of the current segment i and the next segment i+1 may be drastically different ($QoE\_\{i, K\} - QoE\_\{i+1, K\} > T\_h$ 1406), and thus staying at Stream K for the next segment fails to maintain the same level of QoE and also reduces the smoothness of QoE over time. Prior art adaptive streaming approaches are not aware of this because of the lack of QoE information, and when they do not see an increase in network bandwidth or buffer size, they will not switch to a higher bitrate stream. By contrast, the present invention detects the potential QoE drop and finds another Stream J, which has higher bitrate but QoE of the next segment better matched with the QoE of Stream K at the current segment ($Abs[QoE\_\{i+1, J\} - QoE\_\{i, K\}] < T\_l$ 1408). This allows the present invention to better maintain the smoothness of QoE over time and thus better overall QoE of the client users.

Figure 15:
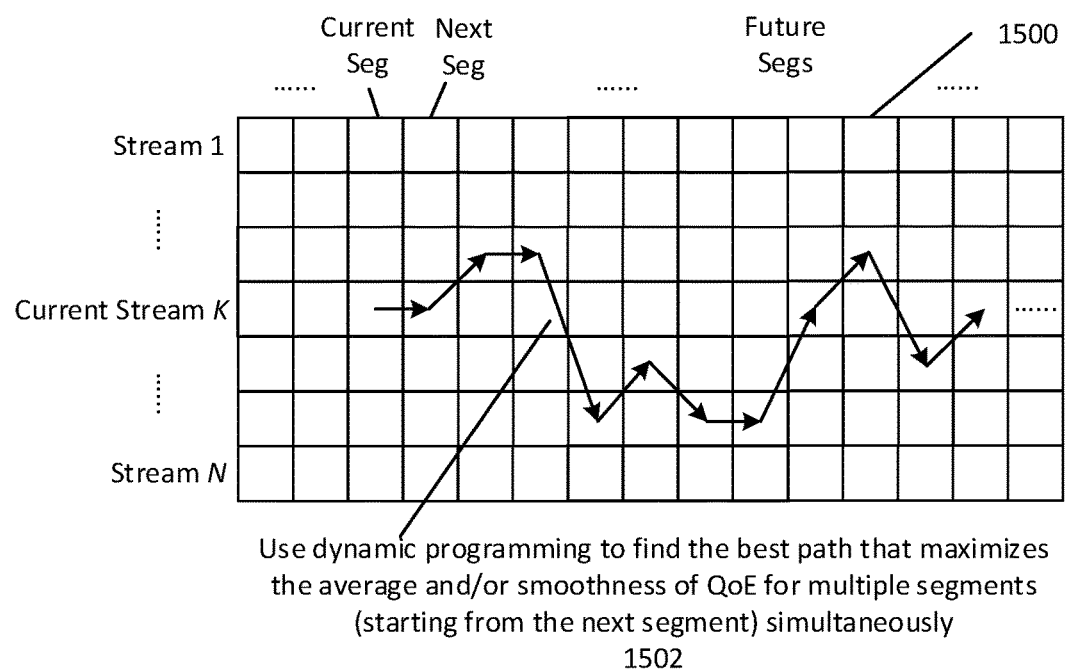
FIG. 15 shows an illustrative example of decision making on the joint selections of a sequence of the next multiple segments of the video in one embodiment of the present invention by performing a dynamic programming optimization to decide on the best path that maximizes the average quality and/or smoothness of QoE. Prior art adaptive streaming approaches do not have the QoE information available, and thus cannot perform such an optimization procedure that gives the optimal overall QoE under the constraints of bandwidth, buffer size and/or other factors.

Another embodiment of the present invention includes a streaming decision making step on the joint selections of a sequence of the next multiple segments of the video at the client site by performing a dynamic programming optimization such as the Viterbi's algorithm to decide on the best path that maximizes the average quality and/or smoothness of QoE 1502. An illustrative example is given in FIG. 15. Prior art adaptive streaming approaches do not have the QoE information available, and thus cannot perform such a dynamic programming optimization procedure that gives the optimal overall QoE under the constraints of bandwidth, buffer size and/or other factors. Instead, one embodiment of the present invention uses the QoE matrix 1500 to perform dynamic programming optimization with possibly additional assumptions about a fixed network bandwidth or certain patterns of the network bandwidth. The resulting optimal path 1502 gives the best overall QoE and/or the smoothest QoE possible, and is not achieved by prior art approaches.

The examples described herein are provided merely to exemplify possible embodiments of the present invention. A skilled reader will recognize that other embodiments of the present invention are also possible. It will be appreciated by those skilled in the art that other variations of the embodiments described herein may also be practiced without departing from the scope of the invention. Other modifications are therefore possible.

An instructive example is given below. To improve readability, the example is largely simplified from real-world scenarios and uses only a subset of the innovative steps of the presentation invention. The example mainly serves instructive purpose to demonstrate how an embodiment of the present smart streaming (SS) invention differs from prior art adaptive streaming (AS) approaches. The example should not be used to circumscribe the broad usage of the present invention.

Assume that there at 3 layers of video streams from the same source content at the hosting server that have bitrates of 500 kbps, 1000 kbps and 2000 kbps, respectively. (The actual bitrate of each video frame fluctuates). Also assume that the network bandwidth is a constant at 800 kbps. Also assume that the player at the client side initially buffered 2 seconds of video before playing the video.

Figure 16:
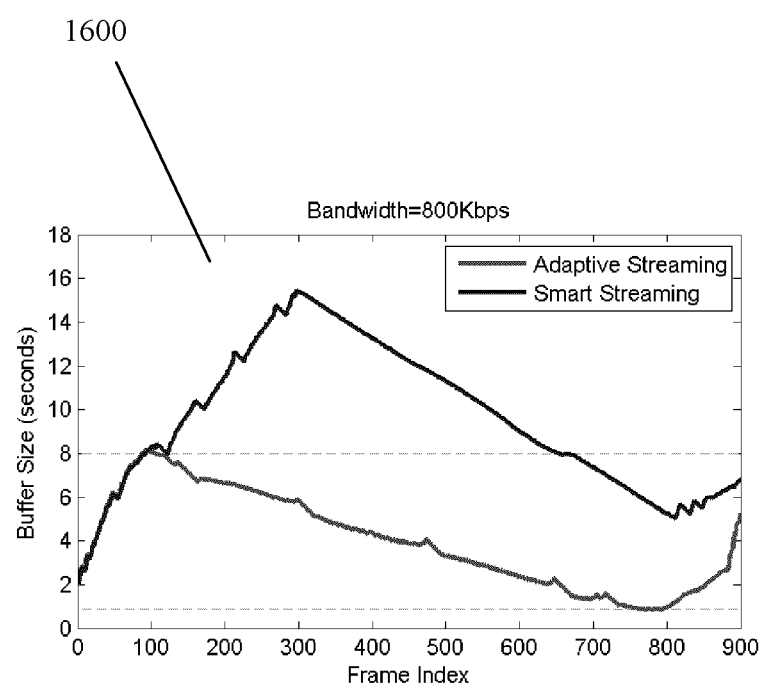
FIG. 16 shows the buffer size as a function of frame index in an illustrative example, for prior art adaptive video streaming, and for smart streaming based on an embodiment of the present invention.
Figure 17:
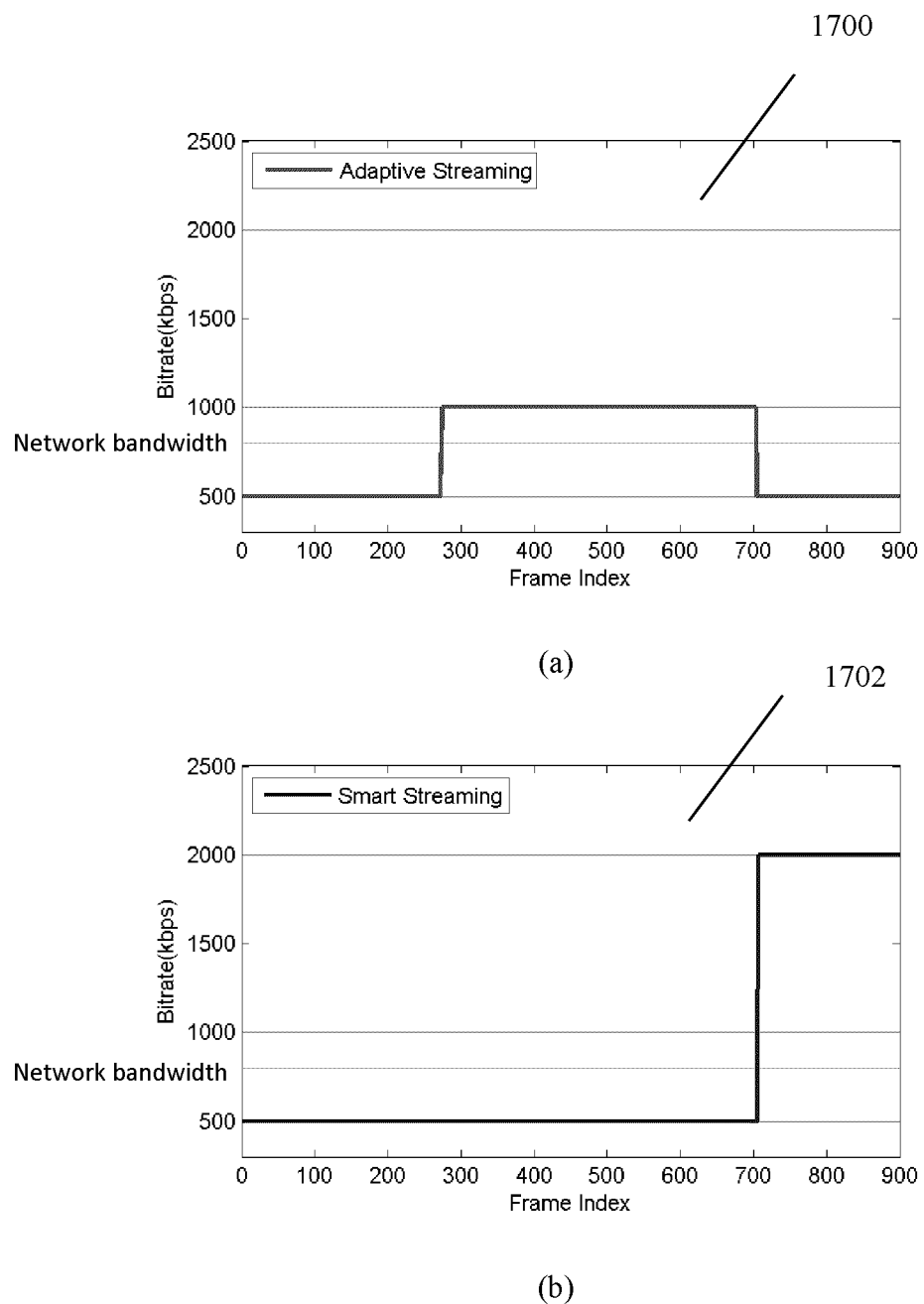
FIG. 17 shows the switching decisions in an illustrative example, for prior art adaptive video streaming (a), and for smart streaming based on an embodiment of the present invention (b).
Figure 18:
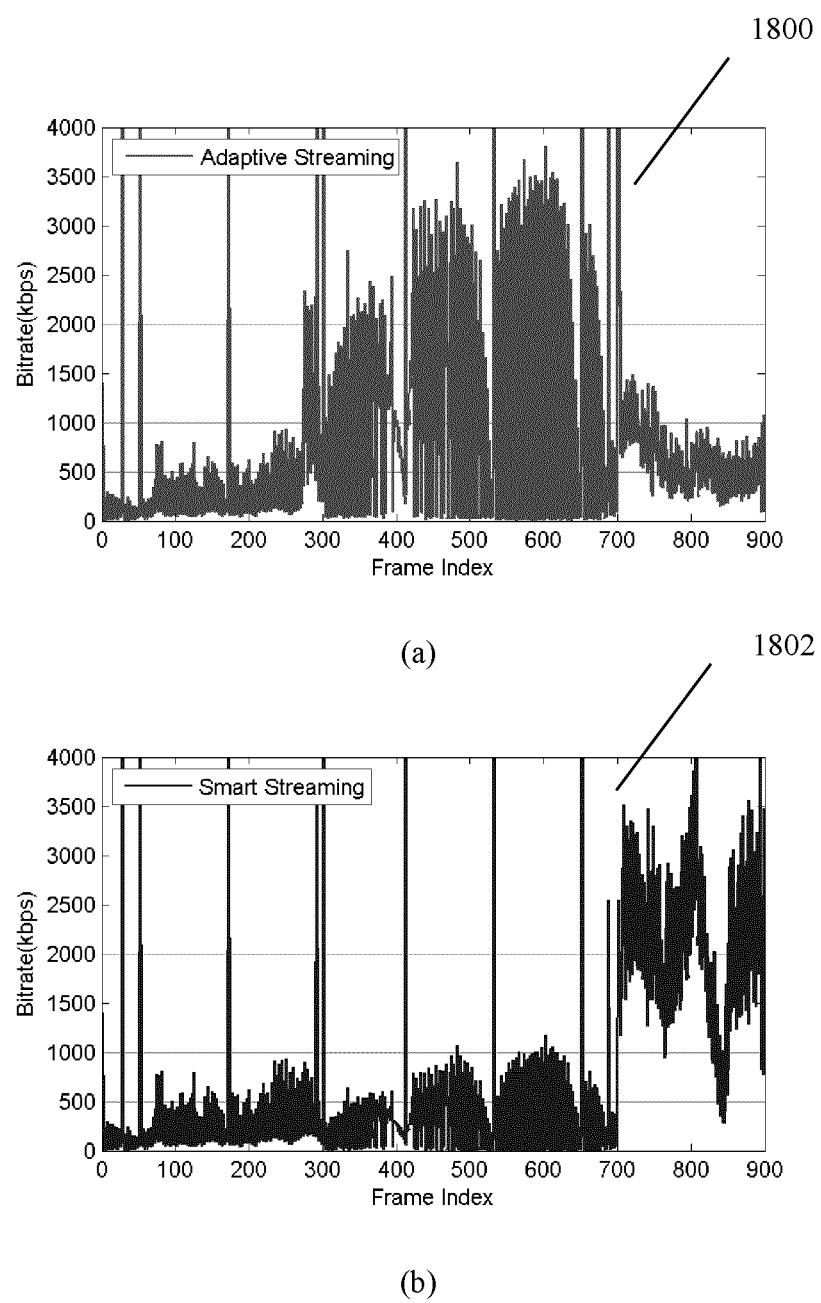
FIG. 18 shows the frame bitrate as a function of frame index in an illustrative example, for prior art adaptive video streaming (a), and for smart streaming based on an embodiment of the present invention (b).
Figure 19:
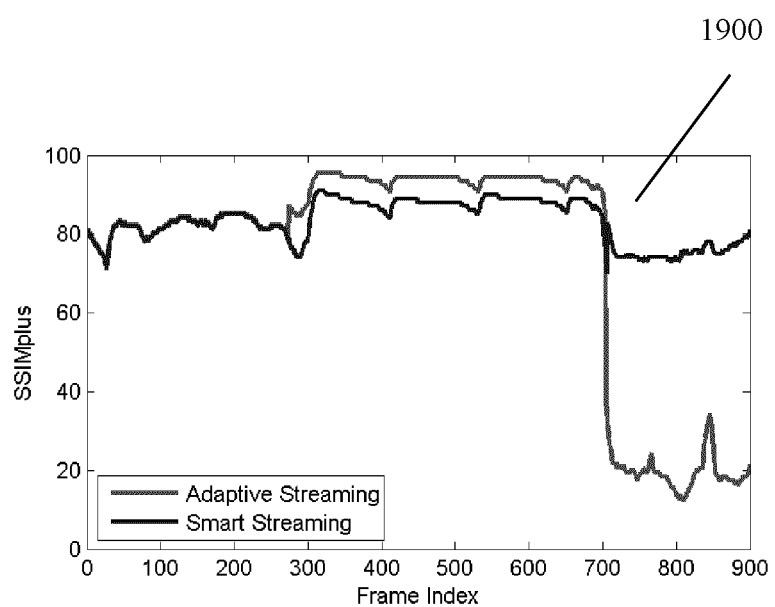
FIG. 19 shows SSIMplus based visual QoE as a function of frame index in an illustrative example, for prior art adaptive video streaming, and for smart streaming based on an embodiment of the present invention.

FIG. 16 compares the buffer sizes as a function of frame number of prior art adaptive streaming approach and the smart streaming approach in an embodiment of the present invention 1600, where the prior art adaptive streaming approach uses 8-second buffer and 2-second buffer as two threshold to trigger switching to higher bitrate and lower bitrate, respectively. In this particular example, since the actual network bandwidth of 800 kbps is between the bitrates of the first layer video stream of 500 kbps and the second layer video stream of 1000 kbps, the prior art adaptive streaming approach will alternatively switch between these two layers. The resulting switching decisions can be visualized in FIG. 17(*a*) 1700, and the resulting actual bitrate as a function of frame index is shown in FIG. 18(*a*) 1800. Such a performance is normal and ideal in prior art adaptive streaming that uses bitrate as the indicator of video quality, because the bitrate versus frame index is smooth. However, constant (or similar) bitrate does not mean the same video quality or visual QoE, which largely depends on the complexity of the video content. In this particular case, the last portion of the video content is much more complicated than the earlier portions. As a result, although the last portion of the prior art adaptive streaming video has similar bitrate when compared with the earlier portions, the visual QoE is significantly lower. This can be measured using an effective QoE measure such as SSIMplus, and the SSIMplus curve of the prior art adaptive streaming video shown in FIG. 19 shows that the viewer's QoE changes dramatically from the earlier to the later portions of the video 1900. This could lead to significant drops of the overall visual QoE and largely affect user dissatisfaction and customer engagement.

By contrast, the smart streaming approach in an embodiment of the present invention behaves differently in this scenario. FIG. 16 shows the buffer size as a function of frame index 1600, FIG. 17(*b*) shows the actual switching decisions of the smart streaming case 1702, and FIG. 18(*b*) gives the resulting actual bitrate as a function of frame index 1802. First, because the QoE of future frames in each layer of video stream is available, the smart streaming module does not trigger switching to a higher bit rate in the middle part of the video, because such switching does not lead to sufficient improvement of QoE, and also because the smart streaming module is foreseeing the highly difficulty future segments (last portion of the video). Second, to maintain the smoothness of visual QoE for the last portion of the video, the smart streaming module triggers a switch to the third layer of video stream of 2000 kbps, which is a much higher bitrate than the network bandwidth. The resulting switching decision in FIG. 17(b) and actual bitrate as a function of frame index in FIG. 18(b) exhibit very large jumps to higher bitrate at the last portion of the video, which is an effect that is not observed in prior art adaptive streaming approaches. Such a new decision making strategy leads to a SSIMplus based QoE curve in FIG. 19, where the smart streaming curve maintains at a high quality level throughout the entire video, with significantly better smoothness and overall performance in QoE 1900. Furthermore, the total bitrate of the smart streaming case is even lower than that of the adaptive streaming case (which can be determined by the buffer sizes at the end of the curves in FIG. 16 1600). Even future, the buffer size curve of the smart streaming case in FIG. 16 is higher than the curve of adaptive streaming, meaning that smart streaming is better prepared to reduce rebuffering and stalling events 1600. In summary, because of the adoption of the smart streaming approach as one embodiment of the present invention, better overall and smoother user QoE than prior art, together with the potential of using a lower overall bitrate and maintaining a healthier buffer.

REFERENCES

[1] Z. Wang and A. Bovik, "Mean squared error: love it or leave it?—a new look at signal fidelity measures," IEEE Signal Processing Magazine, vol. 26, pp. 98-117, January 2009.
[2] Z. Wang, A. C. Bovik, H. R. Sheikh, and E. P. Simoncelli, "Image quality assessment: From error visibility to structural similarity," IEEE Transactions on Image Processing, vol. 13, no. 4, pp. 600-612, April 2004.
[3] Z. Wang, L. Lu, and A. C. Bovik, "Video quality assessment based on structural distortion measurement," Signal Processing: Image Communication, vol. 19, pp. 121-132, February 2004.
[4] Z. Wang, E. P. Simoncelli, and A. C. Bovik, "Multi-scale structural similarity for image quality assessment", IEEE Asilomar Conference on Signals, Systems and Computers, November 2003.
[5] M. H. Pinson, "A new standardized method for objectively measuring video quality", IEEE Transactions on Broadcasting, vol. 50, no. 3, pp. 312-322, September 2004.
[6] K. Seshadrinathan and A. C. Bovik, "Motion tuned spatio-temporal quality assessment of natural videos", IEEE Transactions on Image Processing, vol. 19, no. 2, pp. 335-350, February 2010.
[7] A. Rehman, K. Zeng and Z. Wang, https://ece.uwaterloo.ca/~z70wang/research/ssimplus/
[8] A. Rehman, K. Zeng and Z. Wang, "Display device-adapted video quality-of-experience assessment," IS&T-SPIE Electronic Imaging, Human Vision and Electronic Imaging XX, February 2015.
[9] Z. Wang, A. Rehman and K. Zeng, "Method and system for perceptual objective video quality assessment," U.S. Provisional Patent Application 61/496,923, 2013, PCT 2014.

What is claimed is:

1. A method for adaptive video streaming over video delivery networks, comprising:
   Creating multiple video streams of different bitrates and resolutions from the same video source content, and dividing each of the video streams into time segments;
   Performing quality-of-experience predictions of each of the time segments of each of the video streams during a video preparation stage to obtain quality-of-experience prediction parameters, at a video hosting site, and/or inside a video delivery network;
   Transmitting the quality-of-experience prediction parameters prior to or together with the video streams to a receiver client site;
   Using the received quality-of-experience prediction parameters and client side network, device and viewing environment information to dynamically re-estimate actual user quality-of-experience ("QOE") of each of the time segments of each of the video streams at the receiver client site to obtain a user QoE estimate;
   Creating a matrix of the user QoE estimate for each of the time segments of each of the video streams at the client site;
   Determining, based on the matrix, an optimized path that maximizes the average quality and/or smoothness of quality-of-experience by performing a dynamic programming optimization for joint selections of a sequence of the next multiple time segments of the video streams at the client site; and
   Using the sequence of the next multiple time segments of the video streams, at the receiver client side, to select a time segment from the time segments of the multiple video streams and to request the next time segments of the video streams.

2. The method of claim 1, further comprising performing human subjective quality-of-experience measurement during the video preparation stage, at the video hosting site, or inside the video delivery network, and use subjective ratings as quality-of-experience predictors.

3. The method of claim 1, further comprising using computational full-reference, reduced-reference, and/or no-reference objective video quality assessment models as perceptual quality-of-experience predictors.

4. The method of claim 3, wherein the quality assessment models comprise one or more of peak signal-to-noise ratio ("PSNR"), structural similarity index ("SSIM"), multi-scale structural similarity index ("MS-SSIM"), video quality metric ("VQM"), motion-based video integrity evaluation index ("MOVIE") and SSIMplus models.

5. The method of claim 1, further comprising using full-reference and/or reduced-reference objective perceptual models that produce parameters that are able to compare video quality across different spatial and/or temporal resolutions as quality-of-experience predictors.

6. The method of claim 1, further comprising using objective perceptual video quality models that produce parameters that predict perceptual quality-of-experience dependent on the type and settings of a viewing device, the resolution of the playback window on the viewing device, and/or video viewing conditions at the client site.

7. The method of claim 1, further comprising transmitting the quality-of-experience prediction parameters as metadata prior to the transmission of the video streams or together with the transmission of video streams.

8. The method of claim 1, further comprising transmitting the quality-of-experience prediction parameters by embedding them as watermarks or hidden messages into the video streams.

9. The method of claim 1, further comprising a streaming decision making step on the selection of the next segment of the video streams at the client site that combines quality-of-experience estimation with other available information, including one or more of the bitrates of video streams, the resolutions of the video streams, the available bandwidth of the network, and the decoding speed, display speed, buffer size and power of a receiver device.

10. The method of claim 1, further comprising a streaming decision making step on the selection of the next segment of the video streams at the client site that picks the maximal quality-of-experience video stream, under the constraints of video bitrate, network bandwidth, decoding speed, display speed, buffer size and device power.

11. The method of claim 1, further comprising a streaming decision making step on the selection of the next segment of the video streams at the client site to save bandwidth, to reduce probability of rebuffering, to improve the overall quality-of-experience, and/or to maintain smoothness of quality-of-experience, by rejecting to switch to an affordable higher bitrate and/or higher resolution stream, when without such switching, the quality-of-experience maintains at or above a pre-determined target threshold level.

12. The method of claim 1, further comprising a streaming decision making step on the selection of the next segment of the video streams at the client site to save bandwidth, to reduce probability of rebuffering, to improve the overall quality-of-experience, and/or to maintain smoothness of quality-of-experience, by rejecting to switch to an affordable higher bitrate and/or higher resolution stream when such switching results in quality-of-experience increases lower than a threshold value.

13. The method of claim 1, further comprising a streaming decision making step on the selection of the next segment of the video streams at the client site to save bandwidth, to reduce probability of rebuffering, to improve the overall quality-of-experience, and/or to maintain smoothness of quality-of-experience, by switching to a lower bitrate and/or lower resolution stream, with or without seeing a drop in network bandwidth or buffer size, when such switching results in quality-of-experience drops lower than a threshold value, and/or when with such switching, the quality-of-experience maintains at or above a pre-determined target threshold quality-of-experience level.

14. The method of claim 1, further comprising a streaming decision making step on the selection of the next segment of the video streams at the client site to save bandwidth, to reduce probability of rebuffering, to improve the overall quality-of-experience, and/or to maintain smoothness of quality-of-experience, by switching to a lower bitrate and/or lower resolution stream, with or without seeing a drop in network bandwidth or buffer size, when foreseeing future video segments that need higher than the current bitrate to maintain the same level of quality-of-experience.

15. The method of claim 1, further comprising a streaming decision making step on the selection of the next segment of the video streams at the client site to maintain the current level and smoothness of quality-of-experience by switching to a stream of higher bitrate and/or higher resolution stream, with or without seeing an increase in network bandwidth or buffer size, when without such switching, the quality-of-experience drops more than a threshold value, and when the absolute difference in quality-of-experience between the higher bitrate stream and the current stream at the next segment is lower than another threshold.

16. The method of claim 1, wherein the dynamic programming optimization utilises Viterbi's algorithm to decide on the optimized path.

* * * * *